(12) United States Patent
Lin

(10) Patent No.: US 9,735,839 B2
(45) Date of Patent: Aug. 15, 2017

(54) ITEM OF LUGGAGE

(71) Applicant: HON HAI PRECISION INDUSTRY CO., LTD., New Taipei (TW)

(72) Inventor: Yi-Cheng Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 99 days.

(21) Appl. No.: 14/817,737

(22) Filed: Aug. 4, 2015

(65) Prior Publication Data

US 2016/0352391 A1 Dec. 1, 2016

(30) Foreign Application Priority Data

May 28, 2015 (TW) .............................. 104117105 A

(51) Int. Cl.
*H04B 5/00* (2006.01)
*H04B 17/318* (2015.01)
*A45C 5/04* (2006.01)
*A45C 13/00* (2006.01)

(52) U.S. Cl.
CPC ............ *H04B 5/0056* (2013.01); *A45C 5/04* (2013.01); *A45C 13/00* (2013.01); *A45C 13/001* (2013.01); *H04B 17/318* (2015.01); *A45C 2200/05* (2013.01)

(58) Field of Classification Search
CPC .................................. H04B 5/00; H04B 5/0056
USPC ....................................... 340/10.4; 455/41.1
See application file for complete search history.

(56) References Cited

U.S. PATENT DOCUMENTS

| 2004/0246097 | A1* | 12/2004 | Queenan | G07C 9/00103 340/5.61 |
| 2015/0027836 | A1* | 1/2015 | Zhou | A45C 9/00 190/12 A |
| 2016/0314667 | A1* | 10/2016 | Bang-Olsen | A45C 13/18 |
| 2016/0328900 | A1* | 11/2016 | Yong | E05B 65/0092 |

* cited by examiner

Primary Examiner — Ayodeji Ayotunde
(74) Attorney, Agent, or Firm — Steven Reiss

(57) ABSTRACT

An item of luggage can communicate with a mobile terminal via NFC protocol. A first NFC reader is attached to the luggage item. The first NFC reader includes a reading unit and a memory. The reading unit receives object identification information from an NFC tag attached to every object brought into the near field of the luggage item, and stores the object identification information in the memory. When the mobile terminal is itself brought into the near field of the luggage item, the mobile terminal is given the stored object identification information from the memory, and the object identification information read by the mobile terminal is output for the information of a user.

10 Claims, 3 Drawing Sheets

ITEM OF LUGGAGE

FIELD

The subject matter herein generally relates to data communications.

BACKGROUND

People travel around the world for leisure, business, or study. During travelling, one needs to prepare many things, such as documents and clothes, for departure. An item of luggage such as a case or trunk is needed for accommodating those documents and clothes.

BRIEF DESCRIPTION OF THE DRAWINGS

Implementations of the present technology will now be described, by way of example only, with reference to the attached figures.

DETAILED DESCRIPTION

Figure 1:
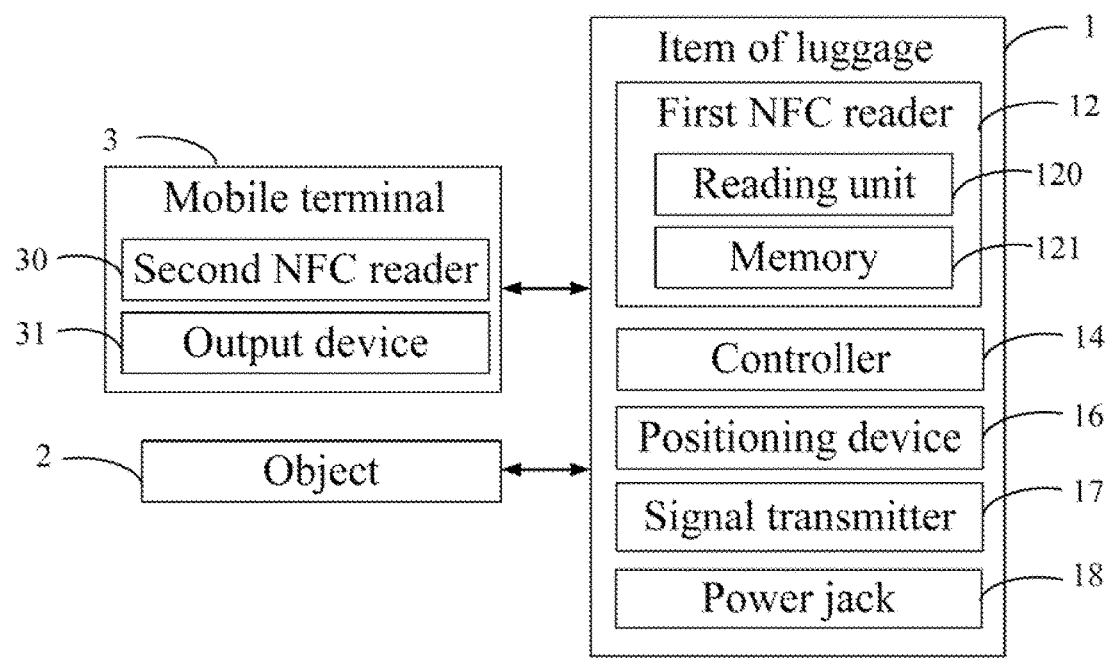
FIG. 1 is a block diagram of a near field communication (NFC) system according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an embodiment of an NFC system 100 applied between an item of luggage 1 and a mobile terminal 3. The item of luggage 1 is able to communicate with the mobile terminal 3 via a near field communication (NFC) protocol, a short-range radio technology such as Bluetooth. The item of luggage 1 is further able to communicate with at least one tagged object 2 via NFC. The mobile terminal 3 may be a smart phone, a tablet computer, or a multimedia player. The tagged object 2 has an NFC tag, and may be a document, or item of clothing placed or needing to be placed within the item of luggage 1.

Figure 2:
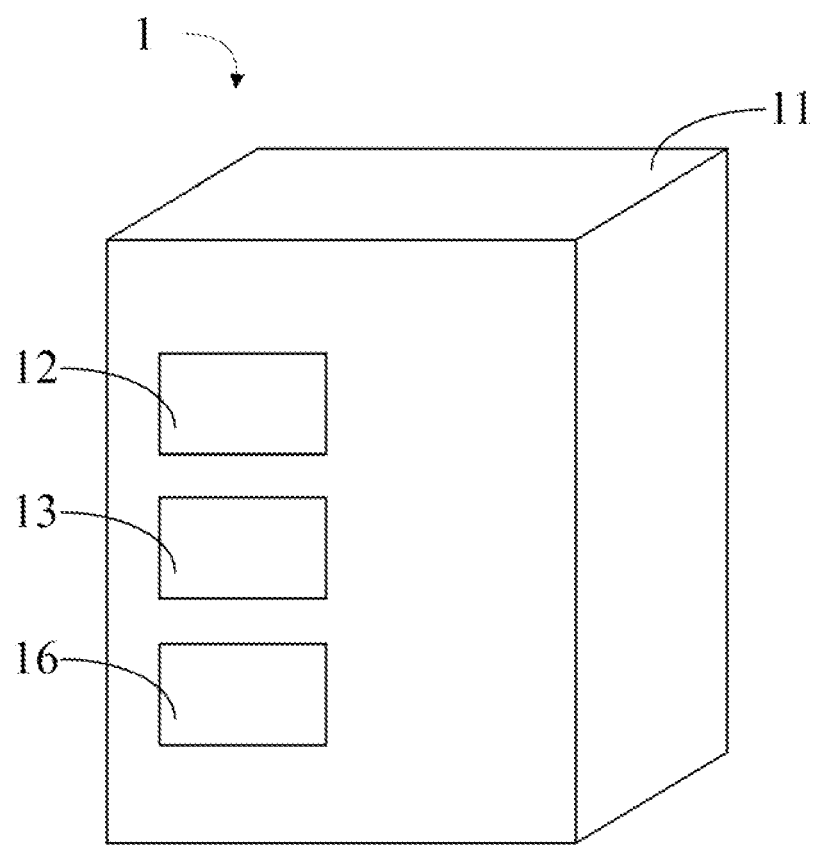
FIG. 2 is a diagrammatic view of an item of luggage included in the NFC system of FIG. 1.

FIG. 2 illustrates that the item of luggage 1 includes a luggage shell 11 configured to store objects and a first NFC reader 12 secured to an exterior surface of the luggage shell 11. The first NFC reader 12 includes a reading unit 120 and a memory 121. Each time a tagged object 2 is moved within the near field of the item of luggage 1 (that is, the tagged object 2 is proximate to the item of luggage 1, for example, when a user places a tagged object 2 into the item of luggage 1), the reading unit 120 reads an object identification information included in the NFC tag, and stores the object identification information in the memory 121. Different tagged objects 2 have different NFC tags, that is, different tagged objects 2 each have different object identification information. A user can thus distinguish between tagged objects 2 which are in the item of luggage 1 or not in the item of luggage 1 according to the object identification information included in the NFC tags.

The mobile terminal 3 includes a second NFC reader 30 and an output device 31. The second NFC reader 30 reads the several stored object identification information from the memory 121 when the mobile terminal 3 is moved into the near field of the item of luggage 1. The output device 31 outputs the object identification information read by the second NFC reader 30, to inform the user as to which tagged objects 2 are moved into the near field of the item of luggage 1 (that is, which tagged objects 2 are placed into the item of luggage 1) according to the output object identification information. In at least one embodiment, the output device 31 is a display screen and/or a loudspeaker. The object identification information is displayed as a text, and/or played as an audio.

In at least one embodiment, the first NFC reader 12 of the item of luggage 1 includes a luggage identification information associated with the user of the item of luggage 1. When the item of luggage 1 is consigned for shipment, the working personnel of a railway station or an airport can learn the identity of user of the item of luggage 1 according to the luggage identification information of the first NFC reader 30. First, the working personnel can move his or her mobile terminal 3 into the near field of the item of luggage 1. Then, the second NFC reader 30 further reads the luggage identification information of the first NFC reader 12. The output device 31 further outputs the luggage identification information read by the second NFC reader 30 to the working personnel.

Furthermore, the second NFC reader 30 of the mobile terminal 3 can further include a terminal identification information. The item of luggage 1 further includes a controller 14. The first NFC reader 12 further reads the terminal identification information of the second NFC reader 30 when the mobile terminal 3 is moved into the near field of the item of luggage 1, and determines whether the terminal identification information reader by the first NFC reader 12 is identical to a preset identification information. If so, the controller 14 determines that access is not permitted to the item of luggage 1, and unlocks the item of luggage 1. In this case, since the working personnel of the railway station or the airport has free access to open the item of luggage 1 during inspections, an authorized user of the item of luggage 1 can move his or her mobile terminal 3 into the near field of the item of luggage 1, to inform the controller 14 to unlock the item of luggage 1 for the working personnel before the inspections.

Figure 3:
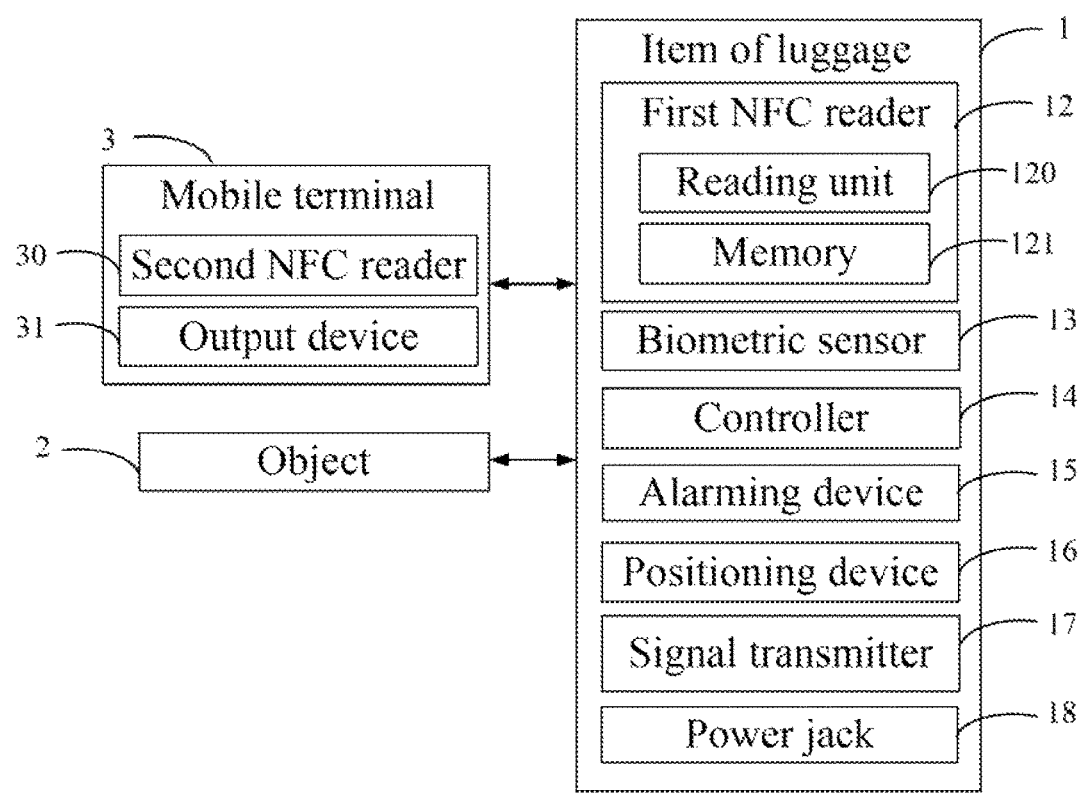
FIG. 3 is a block of a NFC system including additional and/or alternative components as compared to FIG. 1.

FIG. 3 illustrates that in another embodiment, the item of luggage 1 further includes a biometric sensor 13 and an alarming device 15 secured to the exterior surface of the luggage shell 11. If the terminal identification information reader by the first NFC reader 12 is identical to the preset identification information, the first NFC reader 12 further determines a received signal strength indicator (RSSI) of an NFC signal from the mobile terminal 3, and determines whether the RSSI is greater than a preset threshold. If so, the mobile terminal 3 has been closed enough to the item of luggage 1, and the biometric sensor 13 obtains biometric data of a user and compares the biometric data with reference data. If the instant biometric data matches the reference data, the controller 14 determines that access is permitted to the item of luggage 1 and unlocks the item of luggage 1. Otherwise, the controller 14 controls the alarming device 15 to generate an alarm to remind that an unauthorized user attempts to unlock the item of luggage 1. In at least one embodiment, the biometric sensor 13 is a fingerprint reader which is configured to read a fingerprint placed on the fingerprint reader to obtain fingerprint data, compares the fingerprint data with a number of sets of reference fingerprint data, and unlocks the item of luggage 1 if the instant fingerprint data matches any one of the sets of reference fingerprint data. As such, when an authorized user wants to unlock the item of luggage 1, the user must move his or her mobile terminal 3 to be closed enough to the item of luggage 1, to initiate an authentication process (that is, the fingerprint authentication by the fingerprint reader 13), thereby safeguarding the item of luggage 1 and preventing an unauthorized user from opening the item of luggage 1.

In at least one embodiment, the item of luggage 1 further includes a positioning device 16 and a signal transmitter 17 secured to the exterior surface of the luggage shell 11, or inside the luggage shell 11. The positioning device 16 detects an instant location of the item of luggage 1. The signal transmitter 17 transmits the location of the item of luggage 1 to the mobile terminal 3, thereby allowing the user to learn when the item of luggage 1 arrives at a desired location. The positioning device 16 may be a global positioning system (GPS) device or an assisted global positioning system (AGPS) device. The signal transmitter 17 may transmit the location of the item of luggage 1 to the mobile terminal 3 via a WIFI or a 3G network.

In at least one embodiment, the item of luggage 1 further includes a power jack 18 secured to the exterior surface of the luggage shell 11 and electrically connected to a peripheral device (not shown). One or more batteries (not shown) of the item of luggage 1 can be charged via the power jack 18, thereby providing electrical power to the first NFC reader 12, the fingerprint reader 13, the positioning device 16, and the signal transmitter 17. The power jack 18 can be a USB power jack or a wireless power jack. In another embodiment, the battery power connection is hardwired and the power jack 18 is omitted. The item of luggage 1 further includes a battery holder secured to the exterior surface of the luggage shell 11.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An item of luggage capable of communicating with a mobile terminal via a Near Field Communication (NFC) protocol, the item of luggage comprising:
    a luggage shell configured to store objects;
    a first NFC reader secured to an exterior surface of the luggage shell, and comprising:
        a reading unit configured to read an object identification information included in an NFC tag of a tagged object each time the tagged object is proximate to the item of luggage; and
        a memory configured to store the object identification information read by the reading unit, thereby allowing the mobile terminal to read a plurality of stored object identification information from the memory when the mobile terminal is proximate to the item of luggage, and to output the object identification information read by the mobile terminal; and
    a controller and a biometric sensor, wherein the first NFC reader is further configured to read a terminal identification information of a second NFC reader of the mobile terminal when the mobile terminal is proximate to the item of luggage, determine whether the terminal identification information reader by the first NFC reader is identical to a preset identification information, and determine a received signal strength indicator of an NFC signal from the mobile terminal when the terminal identification information is identical to the preset identification information; the biometric sensor is configured to obtain biometric data of a user when the received signal strength indicator is greater than a preset threshold, compare the biometric data with reference data, and unlock the item of luggage if the biometric data matches the reference data.

2. The item of luggage of claim 1, wherein the biometric sensor is a fingerprint reader.

3. The item of luggage of claim 1, further comprising a positioning device and a signal transmitter, wherein the positioning device is configured to detect an instant location of the item of luggage; the signal transmitter is configured to transmit the location of the item of luggage to the mobile terminal.

4. The item of luggage of claim 3, wherein the positioning device is a global positioning system device.

5. The item of luggage of claim 3, wherein the positioning device is an assisted global positioning system device.

6. The item of luggage of claim 3, wherein the positioning device and the signal transmitter are secured to the exterior surface of the luggage shell.

7. The item of luggage of claim 1, further comprising a power jack secured to the exterior surface of the luggage shell and electrically connected to a peripheral device.

8. The item of luggage of claim 7, wherein the power jack is a USB power jack.

9. The item of luggage of claim 7, wherein the power jack is a wireless power jack.

10. An item of luggage, comprising:
    a luggage shell configured to store objects, and including at least tagged objects;
    a memory configured to store preset identification information about an entity authorized to access the luggage shell;
    a biometric sensor configured to obtain biometric data;
    a reader configured to:
        read object identification information from tagged objects placed into and removed from the luggage shell;
        store the object identification information in the memory;
        receive terminal identification information about a mobile terminal proximate to the luggage shell;
        determine whether access is permitted to the luggage shell based on (a) a match between the terminal identification information, the preset identification information and the biometric data and (b) tagged object contents of the luggage shell as identified by the object identification information.

* * * * *